United States Patent [19]
Kifer et al.

[11] Patent Number: 6,114,494
[45] Date of Patent: Sep. 5, 2000

[54] POLYIMIDE MATERIAL AND METHOD OF MANUFACTURE

[75] Inventors: Edward W. Kifer, Trafford; James R. Kwiecinski, Delmont, both of Pa.

[73] Assignee: Ranbar Electrical Materials, Inc., Manor, Pa.

[21] Appl. No.: 09/204,434

[22] Filed: Dec. 3, 1998

[51] Int. Cl.[7] .......................... C08G 73/10; B32B 27/00; B32B 15/00

[52] U.S. Cl. .......................... 528/353; 528/125; 528/128; 528/172; 528/173; 528/176; 528/179; 528/183; 528/185; 528/220; 528/229; 528/350; 428/375; 428/379; 428/394; 428/395; 428/615

[58] Field of Search .................................. 528/125, 126, 528/128, 172, 173, 175, 179, 183, 185, 188, 220, 229, 350, 353; 428/615, 375, 379, 394, 395, 411.1

[56] References Cited

U.S. PATENT DOCUMENTS

| | | | |
|---|---|---|---|
| 4,024,046 | 5/1977 | Lupinski et al. | 204/181 |
| 4,073,788 | 2/1978 | Peterson | 428/458 |
| 4,428,977 | 1/1984 | Peterson | 427/120 |
| 5,147,966 | 9/1992 | St. Clair et al. | 528/188 |
| 5,171,828 | 12/1992 | Meterko et al. | 528/353 |
| 5,268,446 | 12/1993 | Tamai et al. | 528/353 |
| 5,480,965 | 1/1996 | Yamashita et al. | 528/353 |
| 5,632,841 | 5/1997 | Hellbaum et al. | 156/245 |
| 5,639,850 | 6/1997 | Bryant | 528/353 |
| 5,741,883 | 4/1998 | Bryant | 528/353 |

*Primary Examiner*—P. Hampton-Hightower
*Attorney, Agent, or Firm*—Kirkpatrick & Lockhart LLP

[57] ABSTRACT

A fully imidized cresylic acid soluble polymer comprising 4,4'- oxydiphthalic anhydride (ODPA), 3,4,3',4',-biphenyltetracarboxylic dianhydride (BPDA), 3,4'-oxydianiline (ODA), and 4,4'-oxydianiline (DAPE) that can be used as a coating material such as a wire coated enamel. The polyimide has relatively low viscosity and high percent solids by substituting some of the 3,4'oxydianiline with 4,4'oxydianiline. Substitution with the 4,4'oxydianiline can be accomplished up to 25% on the molar basis without losing the fully imidized, cresol solubility characteristics.

54 Claims, No Drawings

POLYIMIDE MATERIAL AND METHOD OF MANUFACTURE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to a polyimide material and its method of manufacture. Particularly this invention relates to a fully imidized cresylic acid soluble polymer prepared from 4,4'-oxydiphthalic anhydride, 3,4,3',4'-biphenyltetracarboxylic dianhydride, 3,4'-oxydianiline, and 4,4'-oxydianiline.

2. Description of the Invention Background

Typical commercial copolyimides are known to perform well as electrical conductor insulators, and therefore act as adhesives, coatings, or films over high temperature electrical conductor materials such as, for example, copper, aluminum, titanium substrates, ceramic, and glass. For instance, magnet wire, for use with manufacturing motors, coils, transformers, and magnetic components, is coated with a copolyimide (wire enamel) in one operation, subsequently wound into motors and transformers, and then dipped, impregnated or trickled with an insulating varnish in another operation. The varnishing step in typical insulating conductor processes necessarily provides mechanical strength and improved electrical properties to the wire. Typical wire enamels and insulating varnishes work in conjunction with other materials to form a complete electrical insulating system. The varnishing step, however, adds significant time and cost to the manufacturing process.

Coating an electrical conductor with copolyimide may be accomplished in a number of ways, such as, for example, through dip coating. The typical polyimide wire enamel is applied to magnet wire from a nitrogen containing solvent in the form of a polyamic acid. In dip coating, the electrical conductor is unwound from a roller at a selected wire speed, passed into a bath of the wire enamel resin, and through a curing tower that converts the polyamic acid to the polyimide state. The curing tower temperature is set sufficiently high, given various factors such as wire speed, to heat the polyimide coating above its glass transition temperature (Tg) in order to drive off solvents.

Due to the insolubility of fully imidized wire enamels, from a practical standpoint, polyimide wire enamels are available only in the polyamic acid state and are soluble only in nitrogen containing solvents, such as N-methyl pyrrolidone. Typical nitrogen solvents used for copolyimides are relatively expensive. In addition, when exposed to air, nitrogen solvents, other than cresylic acid, absorb water and tend to precipitate resin from the solution.

It is known to use 4,4'-oxydiphthalic anhydride and 3,4,3',4'-biphenyltetracarboxylic dianhydride to form copolyimides having specific properties and uses. U.S. Pat. No. 5,171,828 to Meterko et al. discloses copolyimides having high comparative tracking indexes to be used as an electrical insulator formed from 4,4'-oxydiphthalic anhydride, 3,4,3',4'-biphenyltetracarboxylic dianhydride, and 4,4'-oxydianiline or para-phenylenediamine, wherein the copolyimides are applied as a polyamic acid prior to imidizing, and not as an imidized solution.

U.S. Pat. No. 5,639,850 to Bryant discloses a relatively tough wholly aromatic, thermoplastic polyamide copolymer prepared by combining 4,4'-oxydiphthalic anhydride, 3,4,3',4'-biphenyltetracarboxylic dianhydride, and 3,4'-oxydianiline that is soluble in common amide solvents such as, N,N'-dimethyl acetamide, N-methylpyrrolidinone, and dimethyl formamide, and can be applied as a fully imidized copolymer in addition to the amic acid solution. The copolyimides in Bryant, however, have relatively high viscosities in the workable solution that reduces the single pass effectiveness in the enameling process.

Accordingly, the need exists for a copolyimide that can be used in the wire enamel coating process which is a fully imidized cresylic acid soluble polymer that has relatively low viscosity and a high percent of solids for good bonding, insulating, and layering characteristics and which may be self-bonding in order to eliminate the varnishing step in insulating conductor processes.

BRIEF SUMMARY OF THE INVENTION

The present invention satisfies one or more of the above-referenced needs by providing a polyimide material and its method of preparation, the method comprising providing 4,4'-oxydiphthalic anhydride and 3,4,3',4'-biphenyltetracarboxylic dianhydride at a molar ratio ranging from about 25 mole percent to about 75 mole percent 4,4'-oxydiphthalic anhydride to 3,4,3',4'-biphenyltetracarboxylic dianhydride to about 75 mole percent to about 25 mole percent 4,4'-oxydiphthalic anhydride to 3,4,3',4'-biphenyltetracarboxylic dianhydride, adding 3,4'-oxydianiline to the 4,4'-oxydiphthalic anhydride and 3,4,3',4'-biphenyltetracarboxylic dianhydride to form a mixture, adding a solvent to the mixture to form a solution having a percentage of solids effective in maintaining polymer stability, wherein the solvent is selected from the group consisting of a polar aprotic and a polar protic solvent, agitating the solution, adding 4,4'-oxydianiline to the solution to form a modified solution, the 4,4'-oxydianiline added at a molar ratio ranging from about 2 to about 98 mole percent 4,4'-oxydianiline to 3,4'-oxydianiline to about 25 to about 75 mole percent 4,4'-oxydianiline to 3,4'-oxydianiline, agitating the modified solution, and adding an azeotropic solvent to the modified solution and supplying heat effective in removing water to form the coating material. The 4,4'-oxydianiline is added in an amount sufficient to increase the percent solids of the solution.

Moreover, the present invention is directed to a polyimide material, the polyimide material comprising 4,4'-oxydiphthalic anhydride and 3,4,3',4'-biphenyltetracarboxylic dianhydride at a molar ratio ranging from about 25 mole percent to about 75 mole percent 4,4'-oxydiphthalic anhydride to 3,4,3',4'-biphenyltetracarboxylic dianhydride to about 75 mole percent to about 25 mole percent 4,4'-oxydiphthalic anhydride to 3,4,3',4'-biphenyltetracarboxylic dianhydride, and 4,4'-oxydianiline and 3,4'-oxydianiline at a molar ratio ranging from about 2 to about 98 mole percent 4,4'-oxydianiline to 3,4'-oxydianiline to about 25 to about 75 mole percent 4,4'-oxydianiline to 3,4'-oxydianiline.

The present invention also discloses a polyimide material comprising a polymeric chain having the following repeating unit:

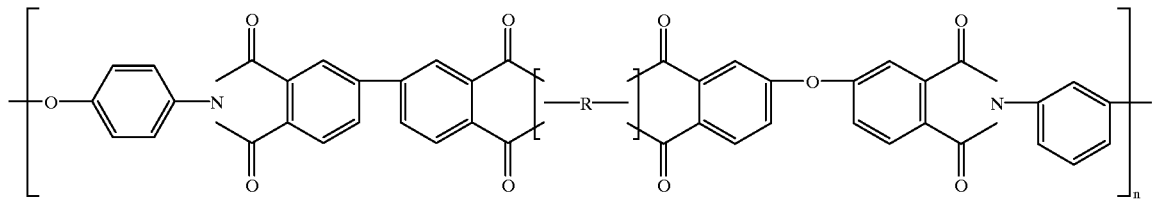

wherein R is a constituent selected from the group consisting of 4,4'-oxydianiline and 3,4-oxydianiline, the 3,4'-oxydianiline and 4,4'-oxydianiline being present in a mole percent range of about 98 mole percent 3,4'-oxydianiline to about 2 mole percent 4,4'-oxydianiline to about 75 mole percent 3,4'-oxydianiline to about 25 mole percent 4,4'-oxydianiline. The 4,4'-oxydianiline is present in an amount sufficient to increase the percent solids in the coating material.

In addition, the present invention provides an electrical conductor, comprising a electrically conductive material and a coating material covering the electrically conductive material, the coating material including 4,4'-oxydiphthalic anhydride and 3,4,3',4'-biphenyltetracarboxylic dianhydride at a molar ratio ranging from about 25 mole percent to about 75 mole percent 4,4'-oxydiphthalic anhydride to 3,4,3',4'-biphenyltetracarboxylic dianhydride to about 75 mole percent to about 25 mole percent 4,4'-oxydiphthalic anhydride to 3,4,3',4'-biphenyltetracarboxylic dianhydride, and 4,4'-oxydianiline and 3,4'-oxydianiline at a molar ratio ranging from about 2 to about 98 mole percent 4,4'-oxydianiline to 3,4'-oxydianiline to about 25 to about 75 mole percent 4,4'-oxydianiline to 3,4'-oxydianiline.

The present invention is also directed to an electrical conductor comprising a electrically conductive material and a coating material covering the electrically conductive material, the coating material including a polymeric chain having the repeating unit described above wherein R is a constituent selected from the group consisting of 4,4'-oxydianiline and 3,4'-oxydianiline, the 4,4'-oxydianiline being present in an amount sufficient to increase the percent solids in the coating material.

Where the present invention is used as a coating, it can be used as both a standard coating or an overcoat enamel. The coating of the present invention can be used to overcoat polyesters during normal wire enamel in place of polyamide-imides with the added benefit of bondability, or as a separate operation to overcoat any enamel wire, adding the ability of bonding with a postcure of the end product.

BRIEF DESCRIPTION OF THE SEVERAL VIEWS OF THE DRAWINGS

Not Applicable

DETAILED DESCRIPTION OF THE INVENTION

Although the discussion herein below is particularly directed to coating materials, such as magnet wire enamel coatings, and their method of manufacture, it should be understood that the present invention can also be used to produce various other materials, including matrix resin composites, neat resin moldings, adhesives, films, filament windings, pultrusions, and the like, and may be used in various processes such as, for example, motor applications, transformers, and general magnet wire applications. Thus, while the present invention is capable of embodiment in many different forms, for ease of description this detailed description discloses only specific forms as examples of the invention. Where the present invention is used in combination with an electrical conductor, the present invention may act as an adhesive, coating, or films over high temperature electrical conductor materials such as, for example, copper, aluminum, titanium substrates, ceramic, and glass. Those having ordinary skill in the relevant art will be able to adapt the invention to application in other forms not specifically presented herein based upon the present description.

The present invention is an improvement over the method and copolymer described in U.S. Pat. No. 5,639,850 to Bryant, which is incorporated herein by reference in its entirety. The present invention provides a fully imidized polyimide thermoplastic material and method of manufacture by reacting 4,4'- oxydiphthalic anhydride (ODPA), 3,4,3',4'-biphenyltetracarboxylic dianhydride (BPDA), 3,4'-oxydianiline (ODA), and 4,4'-oxydianiline (DAPE). The present invention has particular use as an adhesive coating material such as a magnet wire enamel coatings. By combining the above constituents, as provided in greater detail below, a fully imidized cresylic acid soluble polymer is produced having relatively high solids and low viscosity resulting in good bonding, insulating and coating characteristics.

The ODPA and the BPDA are added to the ODA at a ratio of ODPA to BPDA ranging from about 25 mole percent to about 75 mole percent (25:75) to about 75 mole percent to about 25 mole percent (75:25), and may have a mole ratio of 50 mole percent to 50 mole percent (50:50).

Typical ODPA/BPDA containing copolyimides have relatively high viscosities and, thus, a low percent of solids in the workable solution. The range of viscosities that may be typically used in the wire enamel process is about 100 cps to about 5000 cps, but may be about 100 cps to about 1000 cps, with higher solids allowing heavier applications per pass, thereby increasing producivity. Attempts have been made in the prior art to reduce the effects of high viscosity through the use of a monofunctional anhydride or amine endcapper to control the molecular weight and terminate the polymerization of the copolyimide. A preferred endcapper used in the prior art is phthalic anhydride. In addition, offsets affecting the stoichiometry of the process through the introduction of additional moles of amine into the solution allow limitations in molecular weight of the polyimide, thereby increasing the solids percent in the mixture. For example, at an offset of 0, there would be a 1:1 ratio on a molar basis of amine to anhydride. A 5 percent offset produces 5 percent excess amine on an equivalent basis. However, offsets in the stoichiometry only reduce, but do not neutralize, the effects of the high viscosity polyimide and are generally effective only up to about 25 percent before producing copolyimides having molecular weight too low to form a film.

Reduction in the viscosity of polyimide coatings is significant and particularly useful in the wire enamel process because of the relatively narrow range of viscosities that may be used in the process. Relative to the patent to Bryant, it has been discovered that substitution of some of the ODA with DAPE results in a fully imidized cresylic acid soluble polymer having relatively high solids and low viscosity. The ODA and DAPE structures are illustrated as follows:

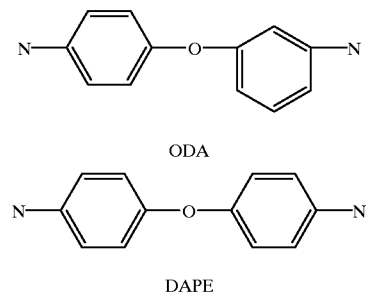

ODA

DAPE

For example, as illustrated below, substituting some ODA with DAPE increases the solids content of the prior art resin solution from about 10–12 percent to about 20–22 percent at about the same viscosity. Substitution of the ODA with DAPE can be performed up to about 25 percent on a molar basis without losing the fully imidized, cresol solubility of the resins. Generally the substitution of ODA with DAPE is in the range of about 5 percent to about 10 percent, but may be about 5 percent. However, as illustrated below, even at low substitution rates of about 2% (and possibly less), the substitution of ODA with DAPE provides viscosity lowering effects, particularly beneficial to the wire enamel process. The resultant repeating polymeric unit is:

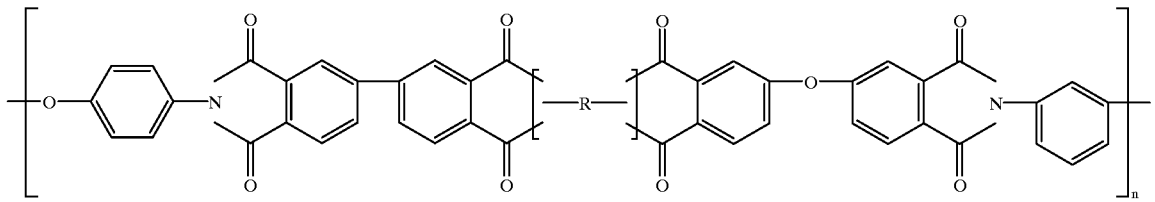

wherein R is either ODA or DAPE in the amounts described above and illustrated below, with the DAPE present in sufficient amount to increase the percent solids while maintaining relatively low viscosity of the coating material.

The percent of solids and the solvent used to synthesize the copolyimides each have an effect on the degree of solubility, and thus, the bonding, self-bonding, and overall effectiveness of the polyimide thermoplastic. Due to the insolubility of fully imidized wire enamels, from a practical standpoint, polyimide wire enamels are available only in the polyamic acid state and are soluble only in nitrogen containing solvents, such as N-methyl pyrrolidone. Typical nitrogen solvents used for copolyimides are relatively expensive and are incompatible with cresylic acid, the normal wire enamel solvent. Nitrogen solvents, other than cresylic acid, when exposed to air, absorb water and tend to precipitate resin from the solution. Water, given off as a by-product, causes blistering in the enamel film if the coating is applied too heavily. Solubility of the polyimide occurs after the imide resin has been formed, provided that the polyimide is not exposed to temperatures above its glass transition temperature (Tg). When dried above its Tg, however, the polyimide has been found to possess beneficial self-bonding properties, and is capable of being layered onto itself or onto other materials.

It is possible to use cresol or nitrogen containing solvents when making the resin solution of the present invention. Because of the problems associated with nitrogen containing solvents in the wire enamel coating process, described above, cresol solvents are preferably used, such as, for example, a mixture of meta, para cresol (such as MP-90, commercially available from Merichem, Houston, Tex.), or a mixture of ortho, meta, para cresols (such as CA-44 and CA-49, also commercially available from Merichem).

The wire enamel of the present invention can terminate with phthalic anhydride (PA), an aromatic anhydride, or with maleic anhydride (MAA), an unsaturated aliphatic anhydride. The use of MAA as an endcapper has beneficial properties when used as a complete substitute for PA in the wire enamel process because the MAA imparts greater flexibility to the wire enamel film relative to the PA. The endcapper may be added at an amount in the range of about 2 mole percent to about 25 mole percent, but may be in the range of about 5 mole percent to about 10 mole percent.

The polyimide of the present invention has an added benefit in that it is self-bonding with the application of heat after the normal wire enameling process. As a result, the need for applying an insulating varnish may be eliminated in the manufacturing process. The surface coating of the present invention can combine two processes into one and provides an electrical conductor, such as, for example, a magnet wire having improved electrical efficiency and advantageous electrical properties. For example, tests of the wire coating of the present invention show the dielectric strength to be about 3,000 volts/mil. Also, when compared to commercial polyimides, the resultant viscosity and percent solids of the present invention will allow heavier applications per pass, thereby increasing productivity.

Moreover, it has been discovered that the polyimides of the present invention can be used as overcoat enamels. They can be used to overcoat polyesters during normal wire enamel in place of polyamide-imides with the added benefit of bondibility. The polyimide of the present invention can also be used in a separate operation to overcoat any enameled wire, adding the ability of bonding with a postcure of the end product.

In order that those skilled in the art may better understand how the invention may be practiced, the following examples are given by way of illustration and not by way of limitation on the invention as defined by the claims.

EXAMPLES

Example 1

This example illustrates the production of a polyimide coating with a 5% offset without the addition of DAPE substitution. A reaction flask equipped with stirrer, $N_2$ sparge and Dean-Stark condenser was charged with 30.9 grams (0.0996 moles) of ODPA, 29.3 grams (0.0996 moles) of BPDA, 42.0 grams (0.2094 moles) of ODA, 2.1 grams of MAA, 300 grams of ≦95% m,p Cresylic Acid M-90), and 30 grams of xylene for azeotropic effect. The mixture was stirred as a slurry at room temperature where an exotherm occurred to about 40° C. The slurry was stirred for about 2 hours with no external heat. The solution was then heated to about 140° C. and held for about 2 hours. During this time, water, as the by-product, was azeotropically removed from the solution. The solution was then heated to completion at a constant rate of about 15° C./hour to about 185° C. to 190° C. The solution was then cooled to about 155° C. at which time Aromatic Hydrocarbon (Aromatic 100) was added. The polymer resin solution yield from this reaction was 558 grams.

Examples 2–5

The same procedure outlined in Example 1, described above, was followed in Examples 2–5. Varying offsets were used for each example. Examples 2 and 3 incorporated about 3.9 and about 14.7 grams of MAA, respectively, as the endcapper, while Examples 4 and 5 incorporated about 1.0 and about 0.16 grams of PA, respectively, in place of MAA. In order to control the molecular weight of these copolyimides, the stoichiometry was offset by the percent listed below. The approximate amounts of all reactants are listed in Table 1 below.

TABLE 1

| Components and Amounts of Examples 2–5 | | | | |
|---|---|---|---|---|
| Component | Ex. 2 | Ex. 3 | Ex. 4 | Ex. 5 |
| 1. ODPA | 30.9 g (0.096 mol) | 30.9 g (0.096 mol) | 29.5 g (0.096 mol) | 30.9 g (0.096 mol) |
| 2. BPDA | 29.3 g (0.096 mol) | 29.3 g (0.096 mol) | 29.3 g (0.096 mol) | 29.3 g (0.096 mol) |
| 3. ODA | 43.9 g (0.219 mol) | 45.9 g (0.229 mol) | 40.1 g (0.2 mol) | 40.1 g (0.2 mol) |
| 4. MAA | 3.9 g | 14.7 g | — | — |
| 5. MP-90 | 300 g | 300 g | 300 g | 300 g |
| 6. Xylene | 30 g | 30 g | 30 g | 30 g |
| 7. Arom. 100 | 150 g | 150 g | 150 g | 150 g |
| 8. PA | — | — | 1.0 g | 0.16 g |
| Offset | 10% | 15% | 3% | 0.5% |

Example 6

The following example illustrates production of a polyimide coating of the present invention having a DAPE modification at 2 percent offset. The DAPE was substituted for ODA at 5% on a molar basis. A reaction flask equipped with stirrer, $N_2$ sparge and Dean-Stark condenser was charged with about 30.9 grams (0.0996 moles) of ODPA, about 29.3 grams (0.0996 moles) of BPDA, about 38.7 grams (0.193 moles) of ODA, about 250 grams of MP-90 (Items 1–4 of Table 2, below) and stirred for ½–1 hour at room temperature. Thereafter, about 2.0 grams (0.01 mol) of DAPE, about 2.0 grams of MAA and about 30 grams of xylene (Items 5–7, respectively, of Table 2) were added and the mixture was stirred as a slurry at room temperature for about 1½ hours where an exotherm occurred to about 40° C. The solution was then heated to about 140° C. and held for 2 hours, during which time water, as the by-product, was azeotropically removed. The solution was then-heated at a constant rate of about 15° C./hour to about 185° C. to 190° C. to ensure complete reaction. The solution was then cooled to about 150° C. to about 155° C., at which time 150 grams of Aromatic 100 and 50 grams of Cresylic Acid (CA-49) (Items 8 and 9, respectively, of Table 2) were added. The polymer resin solution yield from this reaction was 544 grams. The components and approximate amounts are listed in Table 2 below.

TABLE 2

| Components and Amounts of Example 6 | | |
|---|---|---|
| Item | Component | Amount |
| 1 | ODPA | 30.9 grams |
| 2 | BPDA | 29.3 grams |
| 3 | ODA | 38.7 grams |
| 4 | MP-90 | 250 grams |
| 5 | DAPE | 2.0 grams |
| 6 | MAA | 2.0 grams |
| 7 | Xylene | 30 grams |
| 8 | Aromatic 100 | 150 grams |
| 9 | CA-49 | 50 grams |

Examples 7–12

The same procedures were followed in Examples 7–12 as outlined in Example 6, described above. Examples 7–12 include variations in the amounts of reactants used, particularly variations in the amounts of DAPE as a substitute for ODA. The stoichiometry was offset by the percent listed below. The approximate amounts of all reactants are listed in Table 3 below.

TABLE 3

Components and Amounts of Examples 7–12

| Component | Ex. 7 | Ex. 8 | Ex. 9 | Ex. 10 | Ex. 11 | Ex. 12 |
|---|---|---|---|---|---|---|
| ODPA | 30.9 g (0.0996 mol) | 30.9 g (0.0996 mol) | 30.9 g (0.0996 mol) | 30.9 g (0.0996 mol) | 46.4 g (0.1496 mol) | 92.8 g (0.2992 mol) |
| BPDA | 29.3 g (0.0996 mol) | 29.3 g (0.0996 mol) | 29.3 g (0.0996 mol) | 29.3 g (0.0996 mol) | 44.0 g (0.1496 mol) | 88.0 g (0.2992 mol) |
| ODA | 35.1 g (0.175 mol) | 36.6 g (0.183 mol) | 37.8 g (0.189 mol) | 34.4 g (0.172 mol) | 54.9 g (0.275 mol) | 119.8 g (0.550 mol) |
| MP-90 | 300 g | 300 g | 300 g | 200 g | 450 g | 900 g |
| DAPE | 10.5 g (0.053 mol) | 4.1 g (0.021 mol) | 4.2 g (0.021 mol) | 11.5 g (0.058 mol) | 6.2 g (0.031 mol) | 2.4 g (0.012 mol) |
| MAA | 2.1 g | 2.0 g | 2.1 g | 5.9 g | 3.0 g | 6.0 g |
| Xylene | 30 g | 30 g | 30 g | 30 g | 30 g | 45 g |
| Aromatic 100 | 150 g | 150 g | 150 g | 150 g | 225 g | 450 g |
| CA-49 | — | — | — | 100 g | — | — |
| OFFSET | 5% | 2% | 5% | 15% | 10% | 2% |

Example 13

The resin solution of Example 11 was diluted with about 106 grams of MP-90 to reduce viscosity. A like reduction in solids percent resulted, as illustrated in Table 5.

Example 14

The following example illustrates production of a polyimide coating of the present invention having a DAPE modification at 10 percent offset. The DAPE was substituted for ODA at 7.5% on a molar basis. A reaction flask equipped with stirrer, $N_2$ sparge and Dean-Stark condenser was charged with about 61.8 grams (0.1994 moles) of ODPA, about 58.6 grams (0.1993 moles) of BPDA, about 81.2 grams (0.4060 moles) of ODA, about 500 grams of MP-90, about 6.6 grams (0.0330 mol) of DAPE, about 7.8 grams of MAA and about 30 grams of xylene. The mixture was stirred as a slurry at room temperature for about 2 hours where an exotherm occurred to about 40° C. The solution was then heated to about 140° C. and held for 2 hours, during which time water, as the by-product, was azeotropically removed. The solution was then heated at a constant rate of about 15° C./hour to about 185° C. and held for about 1 hour to ensure complete reaction. The solution was then cooled to about 155° C. The polymer resin solution yield from this reaction was 687 grams.

Example 15

This is an example of a powder of the present invention at 2 percent offset dissolved in solvent according to the following procedure. In a container were placed the product at a 2 percent offset (75 grams), 273 grams of Cresylic Acid (WES-297), and 187 grams of Aromatic Hydrocarbon (Aromatic 100). The solution was mixed and heated with good stirring to about 40° C. thereby completely dissolving the solid.

Example 16

When N-methyl pyrrolidone is used as a 1:1 replacement for MP-90 and Aromatic 100, the resin solution produced in Examples 6–14 is readily made into a powder through the following procedure. The dissolved resin mixture in each example is dribbled into a flask of excess water at high speed and high shear. The precipitate is then separated from the water, filtered, and washed to form a powder.

Table 4 illustrates copolymer properties without the benefit of the present invention, and shows that viscosity is a function of the percent offset (molecular weight). The normal viscosity preferred for the normal wire enameling process is about 1000 cps or less. As illustrated in Table 1, as the calculated percent offset increased, the viscosity decreased, with a generally increasing percent solids. An offset of 15 percent was needed to generate a greater than 20 percent solids.

TABLE 4

Viscosity vs. Offset
Without DAPE Substitution

| Sample | Percent Offset | Percent Solids | Viscosity at 25° C. |
|---|---|---|---|
| Ex. 5 | 0.5% | 17.3% | 43520 cps |
| Ex. 4 | 3.0% | 17.8% | 4270 cps |
| Ex. 1 | 5.0% | 17.2% | 2800 cps |
| Ex. 2 | 10.0% | 18.6% | 925 cps |
| Ex. 3 | 15.0% | 20.1% | 180 cps |

Table 5 shows that the addition of DAPE at various amounts as a substitute for some of the ODA. The substitution of DAPE for ODA had the unexpected effect of producing a resin solution having relatively low viscosity and high solids content. As illustrated, even at relatively low offsets, the substitution of 5 to 25 mole percent of DAPE for ODA substantially reduced the viscosity of the copolyimide and provided high solids percent.

TABLE 5

DAPE Modified

| Sample | Percent Offset | Percent Solids | Viscosity at 25° C. | % Dape Substitution |
|---|---|---|---|---|
| Ex. 10 | 15% | 19.0% | 685 cps | 25% |
| Ex. 7 | 5% | 18.8% | 1350 cps | 25% |
| Ex. 9 | 5% | 19.6% | 1790 cps | 10% |
| Ex. 13 | 2% | 18.8% | 1000 cps | 10% |
| Ex. 11 | 2% | 21.6% | 3480 cps | 10% |
| Ex. 8 | 2% | 18.8% | 1000 cps | 10% |
| Ex. 14 | 10% | 25.2% | 4800 cps | 7.5% |
| Ex. 6 | 2% | 19.0% | 1925 cps | 5% |
| Ex. 12 | 2% | 19.0% | 1960 cps | 2% |

Table 6 illustrates how controlling the effective Tg in the wire curing tower aids in lowering the postcure temperature. Although bonding will occur at temperatures above 260° C., manufacturing capabilities are greatly impaired.

TABLE 6

Effect of Tg and Postcure Conditions on Bond Strength of Coated Wire

| Example No. | % Offset | Tg ° C. | Postcure Time at Temperature | Room Temp. Bond Strength |
|---|---|---|---|---|
| Ex. 17 | 1% | 173° C. | 1 hr. at 200° C. | 5.3 |
|  |  |  | 2 hrs. at 220° C. | 8.5 |
| Ex. 18 | 2% | 189° C. | 2 hrs. at 200° C. | 7.3 |
|  |  |  | 2 hrs. at 220° C. | 3.0 |
| Ex. 15 | 1% | 133° C. | 1 hr. at 200° C. | 5.2 |
|  |  |  | 1 hr. at 220° C. | 9.7 |
| Ex. 19 | 1% | 118° C. | 1 hr. at 200° C. | 11.8 |
|  |  |  | 1 hr. at 220° C. | 11.2 |
| Ex. 19 | 1% | 214° C. | 3 hrs. at 220° C. | <1.0 |

The compositions of examples 17–19 are illustrated in Table 7, below.

TABLE 7

Components and Amounts of Examples 17–19

| Component | Example 17 | Example 18 | Example 19 |
|---|---|---|---|
| LaRC-SI[1] 1% Offset | 150 g | — | 150 g. |
| LaRC-SI[1] 2% Offset | — | 150 g | — |
| WES 297 | 678 g | 354 g | 507 g |
| Aromatic 100 | 424 g | 246 g | 415 g |

[1]A polyimide powder purchased from IMITEC, Inc., Schenetady, NY

As described above, the present invention may be used as an overcoat enamel. Table 8 illustrates an off-the-shelf enamel wire, PYRE-ML® being overcoated with the polyimide of the present invention showing polyimide over polyimide bond strength. PYRE-ML® is a commercially available polyimide wire enamel that may be purchased from E. I. Du Pont de Numours and Company, Wilmington, Del. As illustrated, bond strengths were measured while maintained at elevated temperature.

TABLE 8

Bond Strength Test

| Sample | Oven Aging Temperature (° C.) | Oven Aging Time (hrs.) | Room Temperature Bond Strength |
|---|---|---|---|
| Ex. 1/ML | 230 | 1.5 | 0.5, 1.5, 1.5 |
| Ex. 1/ML | 250 | 1.5 | 3.0, 3.0, 2.0 |
| Ex. 11/ML | 270 | 1.25 | 4.5, 5.0, 4.0 |
| Ex. 2/ML | 270 | 1.25 | 3.5, 5.0, 5.5 |
| Ex. 11/ML | 270 | 1.5 | 6.5, 7.0, 5.0 |
| Ex. 1/ML | 270 | 1.5 | 4.0, 3.5, 6.5 |
| Ex. 2/ML | 270 | 2.0 | 3.0, 2.5, 5.5, 2.0 |
| Ex. 11/ML | 270 | 1.5 | 1.0, 4.0, 2.0 |
| | | | Bond Strength at 150° C. |
| Ex. 11 | 270 | 1.0 | 4.0, 3.0, 3.5 |
| | | | Bond Strength at 175° C. |
| Ex. 11/ML | 270 | 1.0 | 2.5, 1.5, 2.0 |
| | | | Bond Strength at 200° C. |
| Ex. 11 | 270 | 1.0 | 4.0, 2.5, 5.5 |
| Ex. 2 | 270 | 1.0 | 3.5, 4.0, 4.5 |
| | | | Bond Strength at 225° C. |
| Ex. 11 | 270 | 1.0 | 2.5, 3.0, 1.5 |
| Ex. 1 | 270 | 1.0 | 3.5, 6.5, 2.5 |

Table 9 illustrates examples of the polyimide of the present invention used as an overcoat enamel over B563 during the normal enameling operation. B563 is a commercially available polyester made by Ranbar Manor Products, Manor, Pa. The polyimide overcoat imparted good physical properties of the enamel wire, specifically heat shock resistance and bondibility. As illustrated, the bondibility was maintained at relatively high temperature.

TABLE 9

| Sample | Oven Aging Temp. (° C.) | Oven Aging Time (hrs.) | Bond Strength At Room Temp. |
|---|---|---|---|
| | | | Bond Strength Overcoated B563[2] |
| JK448D[3]/B563 | 250 | 1 | 4.0, 2.0 |
| JK448D[3]/B563 | 250 | 1 | 6.0, 18.0 |
| | | | Bond Strength at 200° C. |
| JK448D[3]/B563 | 270 | 1 | 1.5, 2.5, 1.0 |
| JK448D[3]/B563 | 230 | 1 | 0.5, 1.0 |
| JK448D[3]/B563 | 200 | 1 | 0.5, 0.5 |
| | | | Bond Strength at 220° C. |
| JK448D[3]/B563 | 270 | 1 | 1.5, 2.0, 1.5 |

[2]A polyester made by Ranbar Electrical Materials, Inc., Manor, PA.
[3]JK448D is a polyimide having components and approximate amounts listed in Table 10:

TABLE 10

Components and Amounts of JK448D

| Item | Component | Amount |
|---|---|---|
| 1 | ODPA | 30.9 grams |
| 2 | BPDA | 29.3 grams |
| 3 | ODA | 42.0 grams |
| 4 | MP-90 | 300 grams |
| 5 | MAA | 2.1 grams |
| 6 | Xylene | 30 grams |
| 7 | Aromatic 100 | 150 grams |

Although the foregoing description has necessarily presented a limited number of embodiments of the invention, those of ordinary skill in the relevant art will appreciate that various changes in the configurations, details, materials, and arrangement of the elements that have been herein described and illustrated in order to explain the nature of the invention may be made by those skilled in the art, and all such modifications will remain within the principle and scope of the invention as expressed herein in the appended claims. In addition, although the foregoing detailed description has been directed to an embodiment of the polyimide coating of the invention in the form of wire coated enamels, it will be understood that the present invention has broader applicability and, for example, may be used in connection with polyimide coatings in additional applications. All such additional applications of the invention remain within the principle and scope of the invention as embodied in the appended claims.

What is claimed is:

1. A method of preparing a polyimide material comprising:

providing 4,4'-oxydiphthalic anhydride and 3,4,3',4'-biphenyltetracarboxylic dianhydride at a molar ratio ranging from about 25 mole percent to about 75 mole percent 4,4'-oxydiphthalic anhydride to 3,4,3',4'-biphenyltetracarboxylic dianhydride to about 75 mole percent to about 25 mole percent 4,4'-oxydiphthalic anhydride to 3,4,3',4'-biphenyltetracarboxylic dianhydride;

adding 3,4'-oxydianiline to the 4,4'-oxydiphthalic anhydride and 3,4,3',4'-biphenyltetracarboxylic dianhydride to form a mixture;

adding a solvent to the mixture to form a solution having a percentage of solids effective in maintaining polymer stability, wherein the solvent is selected from the group consisting of a polar aprotic and a polar protic solvent;

adding 4,4'-oxydianiline to the solution to form a modified solution, the 4,4'-oxydianiline added at a molar ratio ranging from about 2 to about 98 mole percent 4,4'-oxydianiline to 3,4'-oxydianiline to about 25 to about 75 mole percent 4,4'-oxydianiline to 3,4'-oxydianiline;

agitating the modified solution; and adding an azeotropic solvent to the modified solution and supplying heat effective in removing water to form the polyimide.

2. The method of preparing a polyimide according to claim 1, wherein the molar ratio of 4,4'-oxydiphthalic anhydride and 3,4,3',4'-biphenyltetracarboxylic dianhydride is about 50:50.

3. The method of preparing a polyimide according to claim 1, wherein the 4,4'-oxydianiline and 3,4'-oxydianiline are added at a molar ratio ranging from about 5 to about 95 mole percent 4,4'-oxydianiline to 3,4'-oxydianiline to about 10 to about 90 mole percent 4,4'-oxydianiline to 3,4'-oxydianiline.

4. The method of preparing a polyimide according to claim 1, wherein the 4,4'-oxydianiline and 3,4'-oxydianiline are added at a molar ratio of about 5 mole percent 4,4'oxydianiline to about 95 percent 3,4'-oxydianiline.

5. The method of preparing a polyimide according to claim 1, further comprising adding an endcapper after adding the 4,4'-oxydianiline, the encapper being selected from the group consisting of a monofunctional anhydride and a monofunctional amine.

6. The method of preparing a polyimide according to claim 5, wherein the endcapper is maleic anhydride.

7. The method of preparing a polyimide according to claim 1, wherein the polyimide is soluble in cresylic anhydride.

8. The method of preparing a polyimide according to claim 1, wherein the polyimide has a viscosity of less than about 5000 cps and a solids percent greater than about 18 percent.

9. The method of preparing a polyimide according to claim 1, wherein the polyimide has a viscosity of less than about 2000 cps and a solids percent greater than about 18 percent.

10. The method of preparing a polyimide according to claim 9, wherein the polyimide has a percent offset of less than or equal to about 5 percent.

11. A method of preparing a polyimide, comprising:

providing 4,4'-oxydiphthalic anhydride and 3,4,3',4'-biphenyltetracarboxylic dianhydride at a molar ratio ranging from about 25 mole percent to about 75 mole percent 4,4'-oxydiphthalic anhydride to 3,4,3',4'-biphenyltetracarboxylic dianhydride to about 75 mole percent to about 25 mole percent 4,4'-oxydiphthalic anhydride to 3,4,3',4'-biphenyltetracarboxylic dianhydride;

adding 3,4'-oxydianiline to the 4,4'-oxydiphthalic anhydride and 3,4,3',4'-biphenyltetracarboxylic dianhydride to form a mixture;

adding a solvent to the mixture to form a solution having a percentage of solids effective in maintaining polymer stability, wherein the solvent is selected from the group consisting of polar aprotic and polar protic;

adding 4,4'-oxydianiline to the solution to form a modified solution, the 4,4'-oxydianiline being added in an amount sufficient to increase the percent solids of the solution;

agitating the modified solution; and adding an azeotropic solvent to the modified solution and supplying heat effective in removing water to form the polyimide.

12. The method of preparing a polyimide according to claim 11, wherein the molar ratio of 4,4'-oxydiphthalic anhydride and 3,4,3',4'-biphenyltetracarboxylic dianhydride is about 50:50.

13. The method of preparing a polyimide according to claim 11, wherein the 4,4'-oxydianiline and 3,4'-oxydianiline are added at a molar ratio ranging from about 5 to about 95 mole percent 4,4'-oxydianiline to 3,4'-oxydianiline to about 10 to about 90 mole percent 4,4'-oxydianiline to 3,4'-oxydianiline.

14. The method of preparing a polyimide according to claim 11, wherein the 4,4'-oxydianiline and 3,4'-oxydianiline are added at a molar ratio of about 5 molar percent 4,4'oxydianiline to about 95 percent 3,4'-oxydianiline.

15. The method of preparing a polyimide according to claim 11, further comprising adding an endcapper after adding the 4,4'-oxydianiline, the endcapper being selected from the group consisting of a monofunctional anhydride and a monofunctional amine.

16. The method of preparing a polyimide according to claim 15, wherein an endcapper is maleic anhydride.

17. The method of preparing a polyimide according to claim 11, wherein the polyimide is soluble in cresylic anhydride.

18. The method of preparing a polyimide according to claim 11, wherein the polyimide has a viscosity of less than about 5000 cps and a solids percent greater than about 18 percent.

19. The method of preparing a polyimide according to claim 11, wherein the polyimide has a viscosity of less than about 2000 cps and a solids percent greater than about 18 percent.

20. The method of preparing a polyimide according to claim 19, wherein the polyimide has a percent offset of less than or equal to about 5 percent.

21. A method of preparing a polyimide, comprising:

providing 4,4'-oxydiphthalic anhydride and 3,4,3',4'-biphenyltetracarboxylic dianhydride at a molar ratio of about 50 mole percent 4,4'-oxydiphthalic anhydride to about 50 mole percent 3,4,3',4'-biphenyltetracarboxylic dianhydride;

adding 3,4'-oxydianiline to the 4,4'-oxydiphthalic anhydride and 3,4,3',4'-biphenyltetracarboxylic dianhydride to form a mixture;

adding a solvent to the mixture to form a solution having a percentage of solids effective in maintaining polymer stability, wherein the solvent is selected from the group consisting of a polar aprotic and a polar protic solvent;

adding 4,4'-oxydianiline to the solution to form a modified solution, the 4,4'-oxydianiline being added at a molar ratio ranging from about 5 to about 95 mole percent 4,4'-oxydianiline to 3,4'-oxydianiline to about 10 to about 90 mole percent 4,4'-oxydianiline to 3,4'-oxydianiline;

agitating the modified solution; and adding an azeotropic solvent to the modified solution and supplying heat effective in removing water to form the polyimide.

22. The method of preparing polyimide according to claim 21, further comprising adding an endcapper after adding the 4,4'-oxydianiline, the encapper added at a molar ratio ranging from about 2 mole percent to about 25 mole percent.

23. The method of preparing a polyimide according to claim 22, wherein an endcapper is selected from the group consisting of a monofunctional anhydride and a monofunctional amine.

24. The method of preparing a polyimide according to claim 23, wherein an endcapper is maleic anhydride.

25. The method of preparing a polyimide according to claim 21, wherein the polyimide material is soluble in cresylic anhydride.

26. The method of preparing a polyimide according to claim 21, wherein the polyimide has a viscosity of less than about 5000 cps and a solids percent greater than about 18 percent.

27. The method of preparing a polyimide according to claim 21, wherein the polyimide has a viscosity of less than about 2000 cps and a solids percent greater than about 18 percent.

28. The method of preparing a polyimide according to claim 27, wherein the polyimide has a percent offset of less than or equal to about 5 percent.

29. A polyimide, comprising:

4,4'-oxydiphthalic anhydride and 3,4,3',4'-biphenyltetracarboxylic dianhydride at a molar ratio ranging from about 25 mole percent to about 75 mole percent 4,4'-oxydiphthalic anhydride to 3,4,3',4'-biphenyltetracarboxylic dianhydride to about 75 mole percent to about 25 mole percent 4,4'-oxydiphthalic anhydride to 3,4,3',4'-biphenyltetracarboxylic dianhydride; and 4,4'-oxydianiline and 3,4'-oxydianiline at a molar ratio ranging from about 2 to about 98 mole percent 4,4'-oxydianiline to 3,4'-oxydianiline to about 25 to about 75 mole percent 4,4'-oxydianiline to 3,4'-oxydianiline.

30. The polyimide of claim 29 wherein the molar ratio of 4,4'-oxydiphthalic anhydride and 3,4,3',4'-biphenyltetracarboxylic dianhydride is about 50:50.

31. The polyimide of claim 29, wherein the 4,4'-oxydianiline and 3,4-oxydianiline are added at a molar ratio ranging from about 5 to about 95 mole percent 4,4'-oxydianiline to 3,4'-oxydianiline to about 10 to about 90 mole percent 4,4'-oxydianiline to 3,4'-oxydianiline.

32. The polyimide of claim 29, wherein the 4,4'-oxydianiline and 3,4'-oxydianiline and are added at a molar ratio of about 5 mole percent 4,4'-oxydianiline to about 95 mole percent 3,4'oxydianiline.

33. The polyimide of claim 29, wherein the polyimide material is soluble in cresylic anhydride.

34. The polyimide according to claim 29, further comprising a viscosity of less than about 5000 cps and a solids percent greater than about 18 percent.

35. The polyimide according to claim 29, further comprising a viscosity of less than about 2000 cps and a solids percent greater than about 18 percent.

36. The polyimide according to claim 35, further comprising a percent offset less than or equal to about 5 percent.

37. A polyimide, comprising:

a polymeric chain having the following repeating unit:

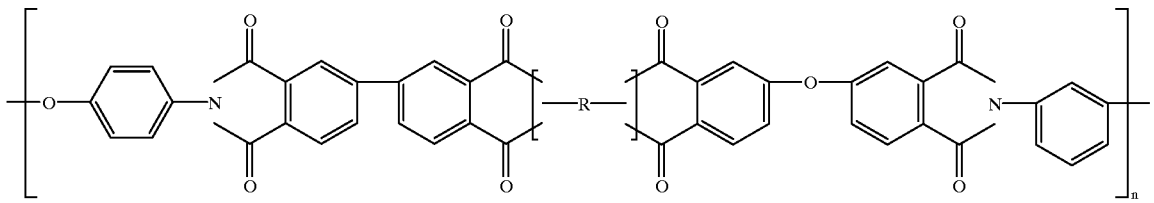

wherein R is a constituent selected from the group consisting of 4,4'-oxydianiline and 3,4'-oxydianiline, the 3,4'-oxydianiline and 4,4'-oxydianiline being present in a mole percent range of about 98 mole percent 3,4'-oxydianiline to about 2 mole percent 4,4'-oxydianiline to about 75 mole percent 3,4'-oxydianiline to about 25 mole percent 4,4'-oxydianiline.

38. A polyimide, comprising:

a polymeric chain having the following repeating unit:

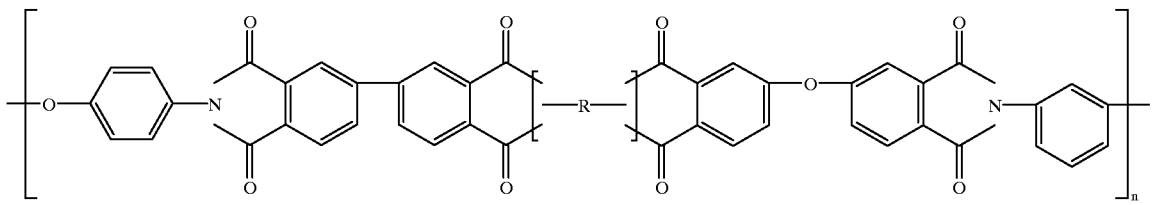

wherein R is a constituent selected from the group consisting of 4,4'-oxydianiline and 3,4'-oxydianiline, said 4,4'-oxydianiline being present in an amount sufficient to increase the percent solids in the polyimide.

39. The polyimide according to claim 38, further comprising a viscosity of less than about 5000 cps and a solids percent greater than about 18 percent.

40. The polyimide according to claim 38, further comprising a viscosity of less than about 2000 cps and a solids percent greater than about 18 percent.

41. The polyimide according to claim 40 further comprising a percent offset less than or equal to about 5 percent.

42. An electrical conductor, comprising:

an electrically conductive material; and a coating material covering said electrically conductive material, said coating material including:

4,4'-oxydiphthalic anhydride and 3,4,3',4'-biphenyltetracarboxylic dianhydride at a molar ratio ranging from about 25 mole percent to about 75 mole percent 4,4'-oxydiphthalic anhydride to 3,4,3',4'-biphenyltetracarboxylic dianhydride to about 75 mole percent to about 25 mole percent 4,4'-oxydiphthalic anhydride to 3,4,3',4'-biphenyltetracarboxylic dianhydride; and 4,4'-oxydianiline and 3,4'-oxydianiline at a molar ratio ranging from about 2 to about 98 mole percent 4,4'-oxydianiline to 3,4'-oxydianiline to about 25 to about 75 mole percent 4,4'-oxydianiline to 3,4'-oxydianiline.

43. An electrical conductor, comprising:

an electrically conductive material;

a coating material covering said electrically conductive material, said coating material including:

a polymeric chain having the following repeating unit:

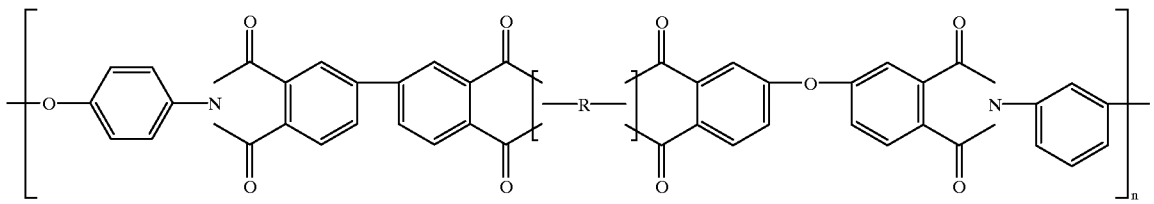

wherein R is a constituent selected from the group consisting of 4,4'-oxydianiline and 3,4'-oxydianiline, said 4,4'-oxydianiline being present in an amount sufficient to increase the percent solids in the coating material.

44. The electrical conductor according to claim 43, wherein the coating material has a viscosity of less than about 5000 cps and a solids percent greater than about 18 percent.

45. The electrical conductor according to claim 43, wherein the coating material has a viscosity of less than about 2000 cps and a solids percent greater than about 18 percent.

46. The electrical conductor according to claim 45, wherein the coating material has a percent of less than or equal to about 5 percent.

47. A polyimide prepared by reacting 4,4'-oxydiphthalic anhydride with 3,4,3',4'-biphenyltetracarboxylic dianhydride, 3,4'-oxydianiline, and 4,4'-oxydianiline.

48. The polyimide of claim 47 wherein the molar ratio of 4,4'-oxydiphthalic anhydride and 3,4,3',4'-biphenyltetracarboxylic dianhydride ranges from about 25:75 to about 75:25.

49. The polyimide of claim 47 wherein the molar ratio of 4,4'-oxydiphthalic anhydride and 3,4,3',4'-biphenyltetracarboxylic dianhydride is about 50:50.

50. The polyimide of claim 47, wherein the 4,4'-oxydianiline and 3,4'-oxydianiline are added at a molar ratio ranging from about 2 to about 98 mole percent 4,4'-oxydianiline to 3,4'-oxydianiline to about 10 to about 90 mole percent 4,4'-oxydianiline to 3,4'-oxydianiline.

51. The polyimide of claim 47, wherein the 4,4'-oxydianiline and 3,4'-oxydianiline and are added at a molar ratio of about 5 mole percent 4,4'-oxydianiline to about 95 mole percent 3,4'oxydianiline.

52. The polyimide according to claim 47, further comprising a viscosity of less than about 5000 cps and a solids percent greater than about 18 percent.

53. The polyimide according to claim 47, further comprising a viscosity of less than about 2000 cps and a solids percent greater than about 18 percent.

54. The polyimide according to claim 53, further comprising a percent offset less than or equal to about 5 percent.

\* \* \* \* \*

UNITED STATES PATENT AND TRADEMARK OFFICE
CERTIFICATE OF CORRECTION

PATENT NO.     : 6,114,494
DATED          : September 5, 2000
INVENTOR(S)    : Kifer et al.

It is certified that error appears in the above-identified patent and that said Letters Patent is hereby corrected as shown below:

In Column 3, line 35, after "comprising", delete "a" and substitute therefor --an--;

In Column 3, line 51, after "comprising", delete "a" and substitute therefor --an--;

In Column 5, line 3, delete "producivity" and substitute therefor --productivity--;

In Column 7, line 17, delete "bondibility" and substitute therefor --bondability--;

In Column 7, line 39, before "M-90" insert --(--;

In Column 7, line 45, delete "140° C." and substitute therefor --140°C--;

In Column 7, line 48, delete "15° C./hour" and substitute therefor --15°C/hour--;

In Column 7, line 48, delete "185° C." and substitute therefor --185°C--;

In Column 7, line 49, delete "155° C." and substitute therefor --155°C--;

In Column 8, Table I, rows 1 and 2, delete each occurrence of "(0.096 mol)" and substitute therefor --(0.0996 mol)--;

In Column 8, line 36, delete "140° C." and substitute therefor --140°C--;

In Column 8, line 38, delete "then-heated" and substitute therefor --then heated--;

In Column 8, line 39, delete "15° C./hour" and substitute therefor --15°C/hour--;

In Column 8, line 39, delete "185° C." and substitute therefor --185°C--;

In Column 8, line 40, delete "C." and substitute therefor --C--;

In Column 8, line 41, delete "150° C." and substitute therefor --150°C--;

UNITED STATES PATENT AND TRADEMARK OFFICE
CERTIFICATE OF CORRECTION

PATENT NO. : 6,114,494

DATED : September 5, 2000

INVENTOR(S) : Kifer et al.

It is certified that error appears in the above-identified patent and that said Letters Patent is hereby corrected as shown below:

In Column 8, line 41, delete "155° C.," and substitute therefor --155°C,--;

In Column 9, line 48, delete "140° C." and substitute therefor --140°C--;

In Column 9, line 51, delete "C./hour" and substitute therefor --C/hour--;

In Column 9, line 51, delete "185° C." and substitute therefor --185°C--;

In Column 9, line 65, delete "40° C." and substitute therefor --40°C--;

In Column 10, Table 4, delete "at 25° C." and substitute therefor --at 25°C--;

In Column 10, line 59, delete "that";

In Column 11, Table 5, delete "at 25° C." and substitute therefor --at 25°C--;

In Column 11, line 28, delete "260° C." and substitute therefor --260°C--;

In Column 11, Table 6, delete "Tg ° C." and substitute therefor --Tg °C--;

In Column 11, Table 6, example 17, delete "173° C." and substitute therefor --173°C--;

In Column 11, Table 6, example 17, delete "200° C." and substitute therefor --200°C--;

In Column 11, Table 6, example 17, delete "220° C." and substitute therefor --220°C--;

In Column 11, Table 6, example 18, delete "189° C." and substitute therefor --189°C--;

In Column 11, Table 6, example 18, delete "200° C." and substitute therefor --200°C--;

UNITED STATES PATENT AND TRADEMARK OFFICE
CERTIFICATE OF CORRECTION

PATENT NO. : 6,114,494

DATED : September 5, 2000

INVENTOR(S) : Kifer et al.

It is certified that error appears in the above-identified patent and that said Letters Patent is hereby corrected as shown below:

In Colunn 11, Table 6, example 18, delete "220° C." and substitute therefor --220°C--;

In Colunn 11, Table 6, example 15, delete "133° C." and substitute therefor --133°C--;

In Colunn 11, Table 6, example 15, delete "200° C." and substitute therefor --200°C--;

In Colunn 11, Table 6, example 15, delete "220° C." and substitute therefor --220°C--;

In Colunn 11, Table 6, the first example 19, delete "118° C." and substitute therefor --118°C--;

In Colunn 11, Table 6, the first example 19, delete "200° C." and substitute therefor --200°C--;

In Colunn 11, Table 6, the first example 19, delete "220° C." and substitute therefor --220°C--;

In Colunn 11, Table 6, the second example 19, delete "214° C." and substitute therefor --214°C--;

In Colunn 11, Table 6, the second example 19, delete "220° C." and substitute therefor --220°C--;

In Column 12, line 26, delete "Numours" and substitute therefor --Nemours--;

In Column 12, Table 8, after "Sample", delete "(° C.)" and substitute therefor --(°C)--;

In Column 12, Table 8, the third example 11/ML, delete "150° C." and substitute therefor --150°C--;

UNITED STATES PATENT AND TRADEMARK OFFICE
CERTIFICATE OF CORRECTION

PATENT NO.    : 6,114,494
DATED         : September 5, 2000
INVENTOR(S)   : Kifer et al.

It is certified that error appears in the above-identified patent and that said Letters Patent is hereby corrected as shown below:

In Column 12, Table 8, the first example 11, delete "175° C." and substitute therefor --175°C--;

In Column 12, Table 8, the fourth example 11/ML, delete "200° C." and substitute therefor --200°C--;

In Column 12, Table 8, example 2, delete "225° C." and substitute therefor --225°C--;

In Column 12, line 66, delete the first occurrence of "bondibility" and substitute therefor --bondability--;

In Column 12, line 66, delete the second occurrence of "bondibility" and substitute therefor --bondability--;

In Column 13, Table 9, after "Sample" delete "(° C.)" and substitute therefor --(°C)--;

In Column 13, Table 9, delete "at 200° C." and substitute therefor --at 200°C--;

In Column 13, Table 9, delete "at 220° C." and substitute therefor --at 220°C--;

In Claim 1, line 1, delete "material";

In Claim 4, line 4, delete "4,4'oxydianiline" and substitute therefor --4,4'-oxydianiline--;

In Claim 5, line 3, delete "encapper" and substitute therefor --endcapper--;

In Claim 14, line 4, delete "4,4'oxydianiline" and substitute therefor --4,4'-oxydianiline--;

UNITED STATES PATENT AND TRADEMARK OFFICE
CERTIFICATE OF CORRECTION

PATENT NO. : 6,114,494
DATED : September 5, 2000
INVENTOR(S) : Kifer et al.

It is certified that error appears in the above-identified patent and that said Letters Patent is hereby corrected as shown below:

In Claim 22, line 3, delete "encapper" and substitute therefor --endcapper--;

In Claim 32, line 2, delete the second occurrence of "and";

In Claim 32, line 4, delete "3,4'oxydianiline" and substitute therefor --3,4'-oxydianiline--;

In Claim 33, line 2, delete "material";

In Claim 46, line 2, after "percent" insert --offset--;

In Claim 51, line 2, delete the second occurrence of "and"; and

In Claim 51, line 4, delete "3,4'oxydianiline" and substitute therefor --3,4'-oxydianiline--.

Signed and Sealed this

Fifteenth Day of May, 2001

NICHOLAS P. GODICI

*Attesting Officer*    Acting Director of the United States Patent and Trademark Office